Figure 1:
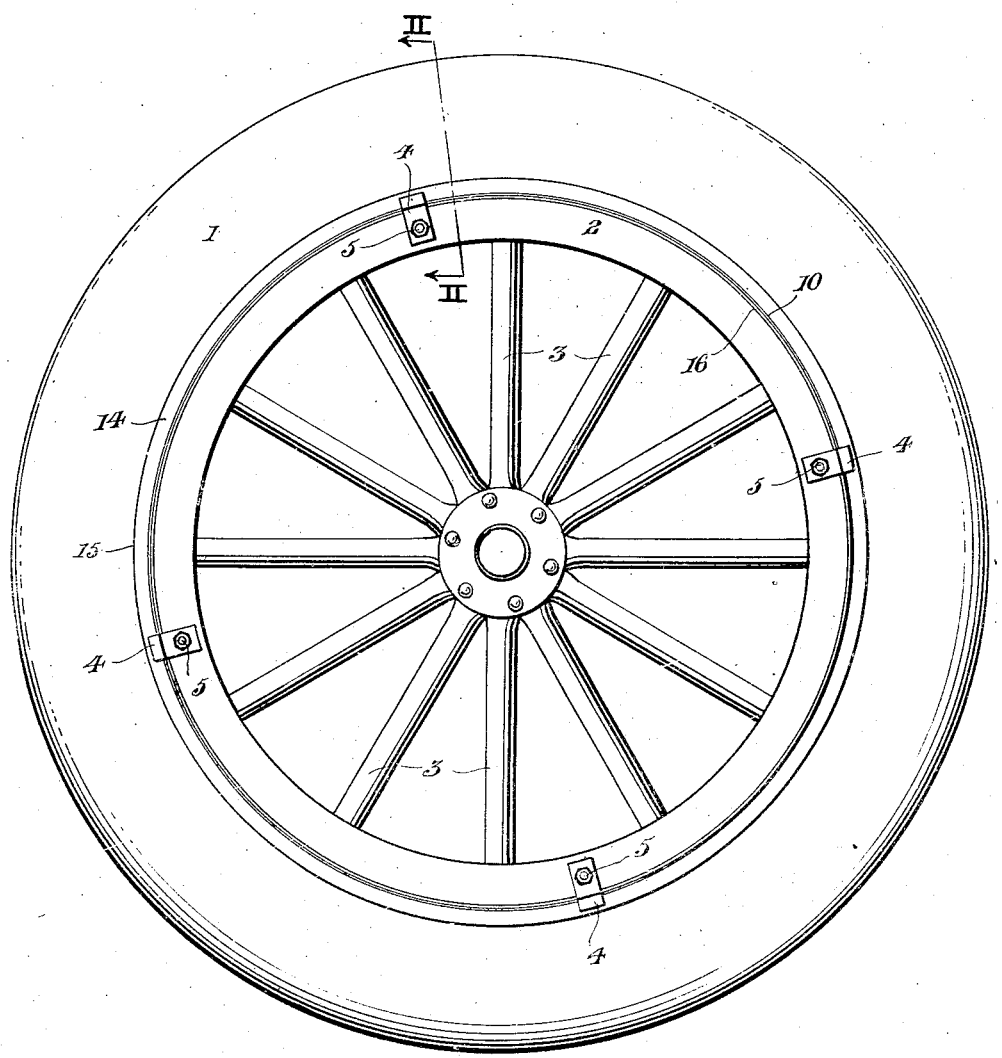

Dec. 28, 1926.

N. B. KREPOKAVICH

CUSHION TIRE AND RIM 1,612,294

Filed June 8, 1922

2 Sheets-Sheet 1

Inventor
N. B. Krepokavich

By F. G. Bryant,
Attorney.

Dec. 28, 1926.  N. B. KREPOKAVICH  1,612,294
CUSHION TIRE AND RIM
Filed June 8, 1922  2 Sheets-Sheet 2

Inventor
N. B. Krepokavich
By F. T. Bryant
Attorney

Patented Dec. 28, 1926.

1,612,294

UNITED STATES PATENT OFFICE.

NICHOLAS B. KREPOKAVICH, OF HAMTON, SASKATCHEWAN, CANADA.

CUSHION TIRE AND RIM.

Application filed June 8, 1922. Serial No. 566,805.

This invention relates to certain new and useful improvements in cushion tires and rims, and has particular reference to a solid rubber tire supported by a sectional rim that is anchored to the felly of a wheel.

A further object of the invention resides in the provision of a sectional rim for supporting a cushion tire wherein the sections of the rim embody telescoping or overlapping plate or band members extending substantially the full width of the tire, a felly band and securing clamps associated with the wheel felly being provided for anchoring the sectional rim to the felly.

With these general objects in view and others that will appear as the nature of the invention is better understood, the same consists in the novel construction, combination and arrangement of parts hereinafter more fully described, illustrated in the accompanying drawings, and pointed out in the appended claim.

Figure 2:
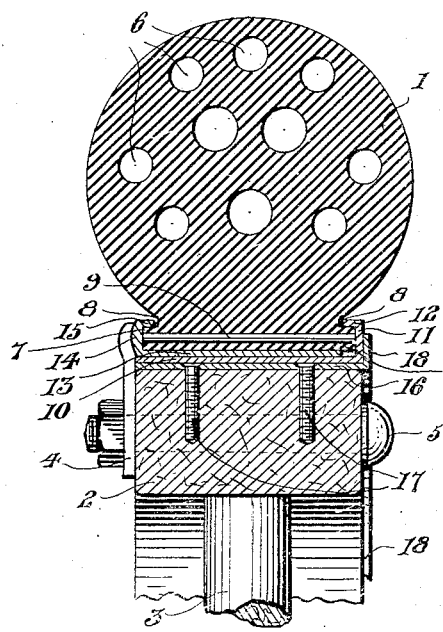
Figure 4:
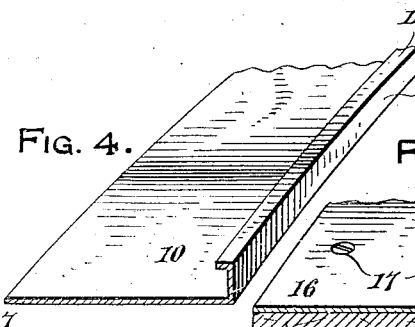
Figure 3:
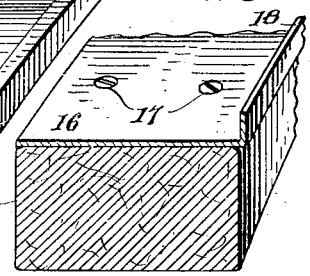
Figure 5:
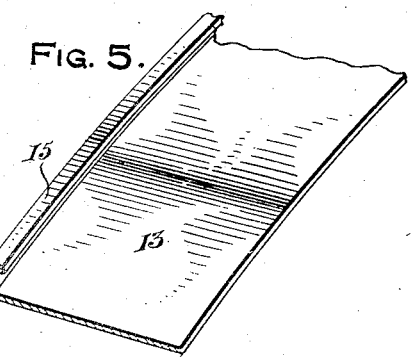
Figure 6:
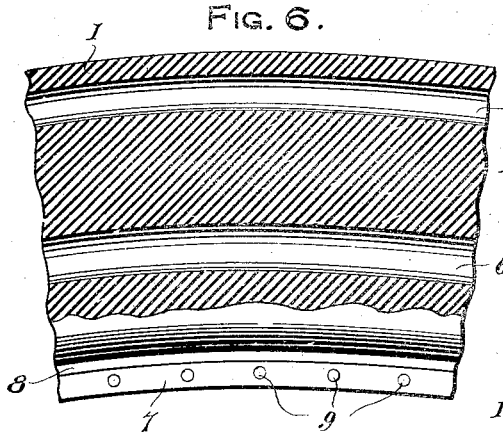
Figure 7:
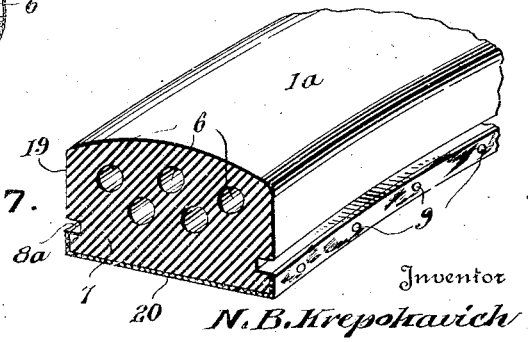

In the drawings forming a part of this application and in which like designating characters refer to corresponding parts throughout the several views:

Fig. 1 is a side elevational view of a cushion tire and rim constructed in accordance with the present invention, the same being illustrated as mounted upon a spoke wheel, Fig. 2 is a cross sectional view taken on line II—II of Fig. 1, showing the sectional rim supporting the cushion tire anchored to the wheel felly, Fig. 3 is a fragmentary perspective view of the wheel felly with a portion of the felly band secured thereto, Fig. 4 is a fragmentary perspective view of a portion of one of the rim sections, Fig. 5 is a fragmentary perspective view of the other rim section, Fig. 6 is a fragmentary longitudinal sectional view of a portion of the tire showing the circumferentially extending air pockets in the cushion tire, and Fig. 7 is a fragmentary perspective view of a modified form of tire.

Referring more in detail to the accompanying drawings, and particularly to Fig. 1 there is illustrated a cushion tire and rim support, the tire being designated by the reference numeral 1 carried by a sectional rim that is mounted upon the felly 2 of a spoke wheel 3, the sectional rim being secured thereto by removable clamps 4 anchored to the felly by bolts 5.

The form of tire is shown more clearly in Figures 2 and 6, the same being of the solid rubber type having circumferentially extending air pockets 6 formed therein with a base portion 7 carried by the inner face thereof and having side flanges defining circumferentially extending side pockets 8 as clearly illustrated. To reinforce the base portion 7, transversely extending rods 9 are carried thereby.

The sectional rim supporting the cushion tire 1 embodies an annular rim section 10 shown in detail in Fig. 4, one edge of the rim section 10 carrying an outwardly directed flange 11 provided with an inwardly directed shoulder 12 upon the outer edge thereof. The other rim section 13 carries an outwardly directed flange 14 upon the edge thereof opposite the flange 11 upon the rim section 10, with an inwardly directed shoulder 15 carried by the outer edge of the rim flange 14. When the rim sections 10 and 13 are assembled, the section 13 is received upon the rim section 10, side flanges 11 and 14 and shoulders 12 and 13 constituting a retaining means for the base portion 7 of the tire, the shoulders 12 and 15 extending into the annular pockets 8 formed by the base portion 7. It will be noted that the depth of the flange 11 upon the inner rim section 10 is substantially equal to the depth of the flange 14 upon the outer rim section 13 combined with the thickness of the outer rim section so that the shoulders 12 and 15 upon the rim flanges are alined for engaging the tire beads.

As shown in Fig. 3, a felly band 16 is permanently secured as at 17 to the outer face of the felly 2, one side of the felly band 13 being provided with an outwardly directed flange 18 that is engaged by the flange 11 upon the rim section 10 to limit the sliding movement of the rim sections 10 and 13 thereon.

To retain the sectional rim upon the felly 2, the bolts 5 extending transversely of the felly 2 receive upon the threaded projecting ends thereof, clamps 4, as clearly shown in Figure 1 and 2, the outer ends of the clamps engaging the rim flange 14 and cooperating with the felly band flange 18 for securely locking the sectional rim upon the wheel felly.

In the form of the invention shown in Fig. 7, the tire 1ª is of a form thus adapted for use in connection with trucks or other hauling vehicles, the same having straight side walls 19 with in-cut annular grooves 8ª, to receive the flange shoulders 12 and 15, while the base portion 7 of the tire is covered by a reinforcing fabric band 20.

From the above detailed description of the device, it is believed that the construction and operation thereof will at once be apparent, and while there are herein shown and described the preferred embodiment thereof, it is nevertheless to be understood that various forms, modifications and arrangements of the parts may be made without departing from the spirit and scope of the invention as claimed.

What I claim is:

A structure for demountably carrying a solid tire wherein said tire will be centrally located in respect to the central vertical plane of the structure and wherein no outward radial wedging action will occur, comprising a felly, a permanent felly band providing a bearing surface equal in width to the felly and entirely extending at right angles to the vertical plane of the latter, a flange formed on one edge of the felly band with its inner bearing face positioned entirely in the vertical plane of the adjacent edge of the felly, an inner rim section of equal width to the bearing surface of the felly band flushly engaging the said surface and having a tire bead clinching flange at one edge provided with an outer side face flushly engaging the bearing face of the felly band flange, an outer rim section of less width than the inner rim section flushly engaging the same and having a tire bead clinching flange at one edge opposing the similar portion of the inner rim section, the space between the tire bead clinching flange and the bearing surface of the inner rim section being greater than the space between the tire bead clinching flange and the bearing surface of the outer rim section whereby to accommodate the bearing surface of the outer rim section and the beaded base portion of the solid tire, and the inner rim section and the flanged edge of the outer rim section adapted to be retained on the felly band by rim securing means.

In testimony whereof I affix my signature.

NICHOLAS B. KREPOKAVICH.